United States Patent [19]

Facon

[11] Patent Number: 4,878,417

[45] Date of Patent: Nov. 7, 1989

[54] METHOD AND APPARATUS FOR SERVO-CONTROLLING THE POSITION OF A PNEUMATIC ACTUATOR

[75] Inventor: Pierre Facon, Versailles, France

[73] Assignee: Bertin & Cie, Plaisir, France

[21] Appl. No.: 159,581

[22] PCT Filed: Jun. 11, 1987

[86] PCT No.: PCT/FR87/00212

§ 371 Date: Feb. 11, 1988

§ 102(e) Date: Feb. 11, 1988

[87] PCT Pub. No.: WO87/07686

PCT Pub. Date: Dec. 17, 1987

[30] Foreign Application Priority Data

Jun. 12, 1986 [FR] France ............... 8608513

[51] Int. Cl.⁴ ............... F15B 9/03; F15B 9/09
[52] U.S. Cl. ............... 91/363 R; 91/459; 73/517 R
[58] Field of Search ............... 91/1, 35, 275, 361, 91/363, 364, 459, DIG. 1; 318/617; 73/517 R; 338/2, 5

[56] References Cited

U.S. PATENT DOCUMENTS

| 4,164,167 | 8/1979 | Imai et al. ............... 91/363 R |
| 4,279,192 | 7/1981 | Kleinwaks ............... 91/361 |
| 4,362,978 | 12/1982 | Pollard et al. ............... 318/568 |
| 4,481,451 | 11/1984 | Kautz et al. ............... 91/361 X |
| 4,510,428 | 4/1985 | Dunne ............... 318/362 |
| 4,537,077 | 8/1985 | Clark et al. ............... 91/35 X |

FOREIGN PATENT DOCUMENTS

| 2421414 | 10/1979 | France . |
| 47504 | 3/1984 | Japan ............... 91/364 |
| 177601 | 10/1984 | Japan ............... 318/217 |
| 1000612 | 3/1983 | U.S.S.R. ............... 91/361 |
| 2111253 | 6/1983 | United Kingdom . |

Primary Examiner—Robert E. Garrett
Assistant Examiner—Mark A. Williamson
Attorney, Agent, or Firm—Dennison, Meserole, Pollack & Scheiner

[57] ABSTRACT

Means for servo-controlling the position of a pneumatic actuator (14) comprise a circuit (20) for controlling a valve (10) for feeding the actuator, and a position sensor (30) and an acceleration sensor (34) which are associated with the moving member (16) of the actuator and which provide position and acceleration signals to the control circuit (20). The invention improves the stability and the accuracy with which the position of a pneumatic actuator is servo-controlled.

13 Claims, 3 Drawing Sheets

METHOD AND APPARATUS FOR SERVO-CONTROLLING THE POSITION OF A PNEUMATIC ACTUATOR

TECHNICAL FIELD

The invention relates to a method and an apparatus for servo-controlling the position of a pneumatic actuator used for displacing a load, for example in robotics.

Up to now, pneumatic actuators have been used on a large scale in industry as on/off actuators because of their robustness, their low cost price, and the convenience of feeding them with compressed air.

PRIOR ART

Attempts have been made to servo-control their position like hydraulic actuators by means of a position sensor connected to a corrector circuit controlling a feed valve of the actuator and taking account of the difference between a reference position and a measured position, and possibly taking account of the first derivative of said difference. However difficulties have always been encountered due to the compressibility of air or of the gas contained in the actuator, and these difficulties give rise to instability and lack of stiffness in the pneumatic actuator, or else to oscillations on either side of the reference position.

SUMMARY OF THE INVENTION

The invention provides a method and an apparatus for servo-controlling the position of a pneumatic actuator, while avoiding these drawbacks.

To this end, the invention provides a method of servo-controlling the position of a pneumatic actuator, consisting in determining the position of the moving member of the actuator, in comparing it with a reference position, and in taking account of the difference between said positions in order to generate a control signal for controlling a valve feeding the actuator with air or gas under pressure, the method being characterized in that it also consists in determining the speed, the acceleration, and the inertia of the moving member, in determining correction factors for the speed and for the acceleration from said inertia, and in generating a valve-control signal which takes account of the above-mentioned position difference and also of the speed and the acceleration of the moving member as corrected by applying the above-mentioned factors in order to cause the moving member to stop in a predetermined position while avoiding oscillations.

By measuring the inertia of the moving member, which varies as a function of the displaced load, and by taking account of it for correcting the speed and acceleration terms in the servo-control loop it is possible to avoid oscillations of the moving member of the actuator and to obtain good servo-control stiffness and stability. Accuracy is improved by the fact that the control signal to the valve can be determined or corrected more quickly from a measurement of acceleration than from a measurement of speed. In addition, the servo-control is automatically adaptable to the size of the load displaced by the actuator.

In practice, the invention will most often be used in cases where it is necessary to displace a load from one point to another as fast as possible without shock and without oscillation on either side of the point of arrival, to return empty or with a different load to the starting point, and to move back to the other point, etc.

To do this, the method in accordance with the invention is characterized in that it comprises an initial stage during which the actuator is fed at a constant predetermined flow rate, e.g. the maximum feed rate of air or gas under pressure, in order to displace the moving member from a completely stopped position, and during which the inertia of the moving member and the corresponding speed and acceleration correction factors are determined, an intermediate stage during which the moving member continues its stroke towards its reference position and the actuator is fed at said flow rate of air or gas under pressure, with the servo-control having no effect on the valve, and a final stage during which said speed and acceleration correction factors are taken into account while generating the valve control signal in such a manner as to cause the moving member to reach the reference position and to stop there.

Thus, from the beginning of each new stroke of the moving member of the actuator, the inertia of the displaced mass is determined and the corresponding correction factors for the speed and acceleration terms in the servo-control are calculated or determined: however they have no effect on the servo-control until the displaced mass or the moving member of the actuator has reached a point which is relatively close to the point of arrival, beyond which point it is necessary to begin changing the feed to the actuator in order to cause the load to stop at the desired point under the best conditions, i.e. as quickly as possible but without shock or oscillation.

According to another characteristic of the invention, the inertia of the moving assembly displaced by the actuator is determined by measuring the initial acceleration of the moving member of the actuator while the valve is feeding the actuator with a predetermined constant flow rate, e.g. the maximum flow rate, of air or gas under pressure.

In this manner, the moving member of the actuator always starts under the same actuator feed conditions while simultaneously accelerating the beginning of moving member displacement.

The invention also provides for comparing the inertia of the displaced mass with predetermined values and for selecting corresponding predetermined speed and acceleration correction factors as a function of the results of said comparison, which correction factors are retained until the moving member has stopped.

The correction factors are not particularly critical, and it suffices to have available a plurality of values for said factors corresponding to a plurality of mass inertia values which are likely to be displaced by the actuator.

The invention also provides apparatus for servocontrolling a pneumatic actuator, the apparatus comprising a control circuit for controlling a valve for feeding the actuator with air or gas under pressure, a position sensor associated with the moving member of the actuator and connected to an input of the control circuit, said control circuit having another input for receiving a signal representative of a reference position for the moving member of the actuator, the control circuit including means for determining the difference between the signal provided by the position sensor and the reference position signal, and for generating a control signal for controlling the valve, the apparatus being characterized in that it includes means for determining the speed and the acceleration of the moving member, means for determining the speed and accelerating correction factors as a function of the inertia of the moving member, and means for generating a control signal for controlling the valve as a function of the position difference signal and of the corrected speed and acceleration signals.

The control circuit may also include means for comparing the inertia of the displaced mass with predetermined values, and means for adjusting or selecting the corresponding values of the speed and acceleration correction factors.

Advantageously, the acceleration sensor is of the type comprising a mass mounted on a flexible blade, with strain gauges being fixed to the base of the blade.

The control circuit may be of the analog type or of the digital type, in which case the acceleration sensor is connected to the control circuit via an analog digital converter.

The invention is applicable both to servo-controlling a linear pneumatic actuator and to servo-controlling a rotary pneumatic actuator. The accuracy and the stability of the servo-control of displacement of the moving member of the actuator make advantageous applications in robotics possible.

BRIEF DESCRIPTION OF THE DRAWINGS

Other characteristics, details, and advantages of the invention appear from reading the following description given by way of example and with reference to the accompanying drawings, in which.

BEST METHOD OF PERFORMING THE INVENTION

Figure 1:
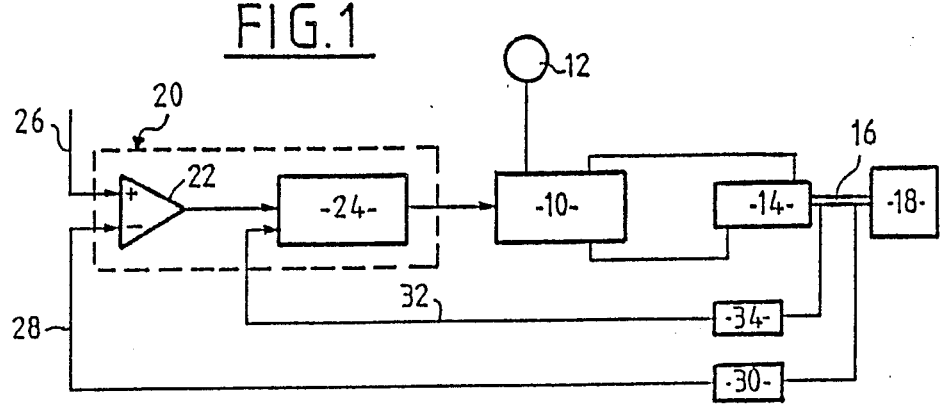
FIG. 1 is a block diagram of apparatus in accordance with the invention for servo-controlling the position of a linear pneumatic actuator.

Reference is made initially to FIG. 1 which is a block diagram of apparatus in accordance with the invention for servo-controlling the position of a pneumatic actuator.

This apparatus comprises a pneumatic valve 10 connected firstly to a source 12 of air or gas under pressure and secondly to the feed orifices of a pneumatic actuator 14 of the type that displaces its moving member linearly, which member is constituted in this case by a piston rod 16 used for displacing a load 18 whose mass may vary.

The pneumatic valve 10 is of the proportional action type and comprises, for example, a slide slidably mounted in a jacket. The displacement of the slide is controlled by an electrical thruster associated with a return spring, and is approximately proportional to the electrical current flowing in the excitation winding of the thruster. Thus, the valve feeds one or other of the orifices of the actuator 14 with a flow of gas under pressure which is substantially proportional to the displacement of the slide.

In order to avoid disturbances due to friction between the slide and the jacket of the valve, a square-wave electrical signal at an appropriate frequency (e.g. about 100 Hz) is superposed on the control signal applied to the valve. It causes the slide to vibrate, thereby eliminating the consequences of friction.

The control signal to the valve is provided by a control circuit 20 comprising a comparator 22 and a corrector circuit 24. One input of the comparator 22 receives a reference signal 26 corresponding to a reference position for the moving member 16 of the actuator 14, and the other input to the comparator receives a real position signal 28 representative of the real position of the moving member 16 and provided by a position sensor 30 associated with the moving member, said position sensor 30 may be of the analog type, e.g. a potentiometer, or else of the digital type, e.g. an optical encoder.

The output signal from the comparator 22 is transmitted to one of the inputs of the corrector circuit 24 whose other input receives a signal 32 provided by an acceleration sensor 34 associated with the moving member 16 of the actuator.

Figure 2:
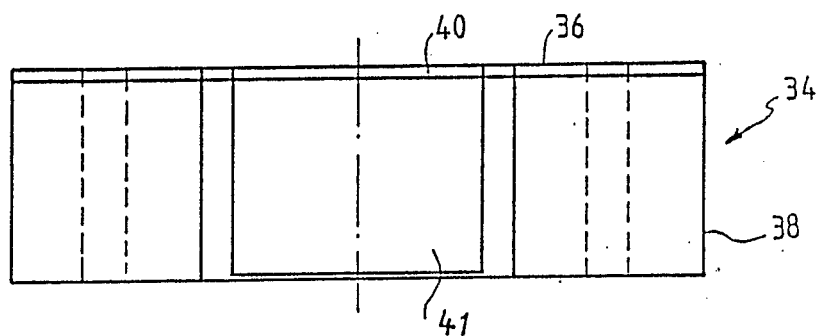
FIGS. 2 and 3 are an edge view and a plan view of an acceleration sensor used in the FIG. 1 apparatus.
Figure 3:
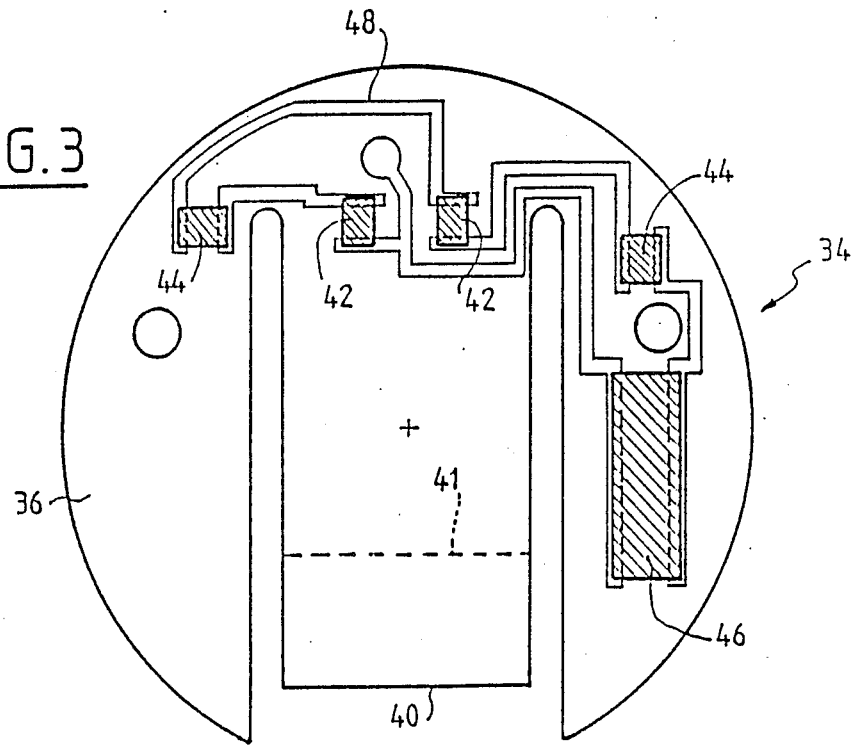

The acceleration sensor 34 may be, for example, of the type shown in FIGS. 2 and 3 comprising a wafer 36, e.g. of ceramic material, mounted on a support 38. The ceramic wafer includes a flexible blade 40 having a mass 41 fixed to the end thereof. Two strain gauges 42 are mounted on the base of the flexible blade 40, i.e. to the portion thereof which is subjected to stress as a function of the acceleration of the moving member 16 of the actuator, with said strain gauges being connected to two other strain gauges 44 which are mounted on the wafter 36 in zones which are not subjected to stresses as a function of acceleration, and also to a strain gauge 46 for providing a degree of temperature compensation and mounted on a non-deformable portion of the wafer 36. The strain gauges 42, 44, and 46 may be deposited by silkscreen printing onto the wafter 36 and are interconnected by means of a printed circuit 48 also made by silkscreen printing, thereby constituting a measurement bridge.

Mechanical abutments (not shown) limit the amplitude of deformation of the flexible blade 40 in the event of a shock in order to avoid breaking it.

The corrector circuit 24 (FIG. 1) generates a signal for controlling the pneumatic valve 10 on the basis of the signal representative of the difference between the reference signal 26 and the position signal 28, of a signal representative of the speed of displacement of the moving member 16 which is the derivative of the above-mentioned difference signal, of the acceleration signal 32 provided by the sensor 34, and optionally for the purpose of increasing static accuracy, of an integral term obtained by integrating the said difference signal.

When the corrector circuit 24 is of the analog type, the acceleration signal 32 provided by the sensor may be applied directly to one of its inputs. However, if the corrector circuit 24 is of the digital type (e.g. a microprocessor of the type commercially available in the form of an integrated circuit), the output from the sensor 34 is connected to the corresponding input of the corrector circuit 24 via an analogto-digital converter.

The control signal applied to the pneumatic valve 10 by the corrector circuit 24 must also take account of the inertia of the moving assembly 16, 18 of the actuator 14.

The invention provides for the inertia of this assembly to be determined by measuring the initial acceleration of the member 16 at the beginning of its displacement. The proportions or the gains of the speed and acceleration signals in the corrector circuit 24 must be functions of the inertia of the load displaced by the actuator. When the inertia is large, the proportions of the speed and acceleration signals relative to the position difference signal must be increased. Conversely, when the inertia is low or substantially zero, it is preferable to reduce these two signals in order to obtain optimum operation.

The invention thus makes it possible to automatically adapt the transfer function of the servo-control apparatus to the magnitude of the inertia of the load displaced by the actuator.

To do this, the invention provides for the actuator 14 to be fed with a predetermined constant flow rate of gas under pressure at the beginning of displacement of the load 18 and this flow rate may be the maximum flow rate in order to reduce the total time for displacing the load from one point to another. The acceleration signal provided by the sensor 34 is then inversely proportional to the total inertia of the moving masses. By knowing this inertia, it is possible to select or calculate the corresponding proportions or gains to be applied to the speed and acceleration signals which are taken into account when generating the signal for controlling the pneumatic valve. These proportions or gains are retained until the movement has come to rest, after which they are again determined during the next movement.

The adaptation to the total inertia of the moving masses may take place in discrete steps. It is sufficient to have a few values available to be applied to the proportions or gains of the speed and acceleration signals in order to cover the entire operating range of the actuator, since the adjustment of the speed and acceleration terms in the corrector circuit is not particularly critical. It may thus suffice to compare the value of the initial acceleration with predetermined thresholds in order to determine which range of values contains the total inertia of the masses in motion and to select the corresponding correction factors for the speed and acceleration signals from previously stored tables of values.

The position of the pneumatic actuator is servo-controlled as follows:

In a first stage at the beginning of which the moving member is at rest in a starting position, the actuator is fed at a predetermined constant flow rate, for example at the maximum flow rate of air or gas under pressure and the moving member 16 begins to move together with the load 18 towards a reference or arrival position. The inertia of the total mass displaced by the actuator is determined by measuring the initial acceleration of the moving member, and the correction factors for applying to the speed and acceleration signals are determined as indicated above.

During the next or intermediate stage, which is of varying length depending on the distance to be travelled, the actuator is fed with the predetermined constant flow rate of air or gas under pressure, with displacement taking place at substantially constant speed and with the servo-control apparatus in operation but completely saturated since the difference between the reference position signal and the real position signal is much greater than the corrected speed and acceleration signals which have substantially no effect on the correct signal to the valve.

During the final stage during which the reference or arrival position is approached, the corrected speed and acceleration signals are no longer negligible compared with the difference between the real position signal and the reference position signal, and the valve feeds the actuator in such a manner as to cause the moving member to arrive at the reference position without shock and to stop at said position without oscillating in minimum time.

The invention is applicable to servo-controlling the position of all types of pneumatic actuator. However, it is advantageous to be able to mount the valve 10 together with the position sensor 30 and the acceleration sensor 34 directly on the actuator so as to obtain a compact assembly with a minimum of pneumatic and electrical connections.

For a linear displacement actuator, the moving member may be constituted by a piston rod in conventional manner, with the actuator cylinder being fixed, or else the moving member may be constituted by the actuator cylinder which moves relative to a piston rod that is held fixed.

Figure 4:
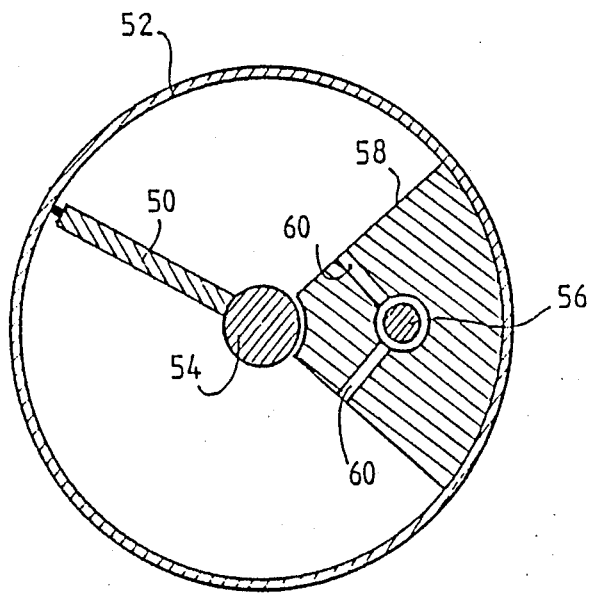
FIGS. 4 and 5 are a section view and a plan view of a rotary pneumatic actuator controlled by apparatus in accordance with the invention.
Figure 5:
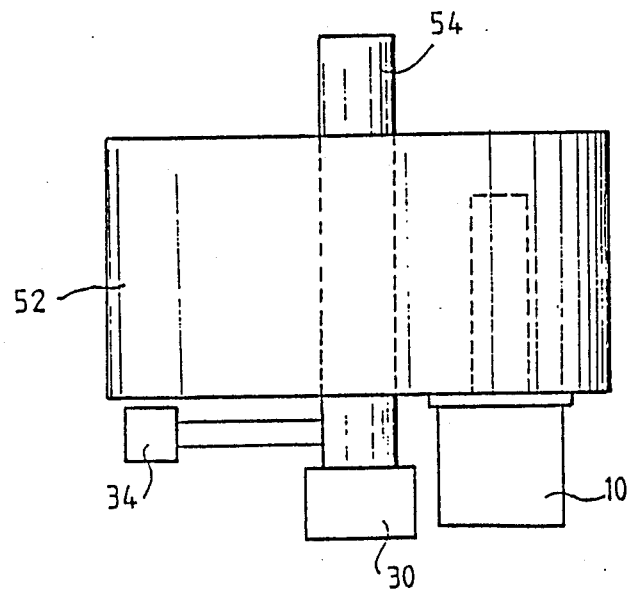

For a rotary actuator, as shown in FIGS. 4 and 5, the rotary member may be constituted by a flap 50 mounted to rotate about the longitudinal axis of a cylinder 52 and fixed to a shaft 54 having one end connected to a load to be displaced and having its other end associated with the position sensor 30 and the acceleration sensor 34.

The pneumatic valve 10 and its electrically operated control thruster are fixed on the cylinder 52 of the actuator, with the slide of the valve being slidably mounted in a bore of a part 58 which is fixed to the inside of the cylinder 52 and which constitutes an abutment limiting displacement of the flap 50 in either direction, said part 58 including ducts 60 at different levels for providing communication between the bore in which the slide 56 is displaced and the inside volumes or the cylinder 52 which are separated by the flap 50.

Figure 6:
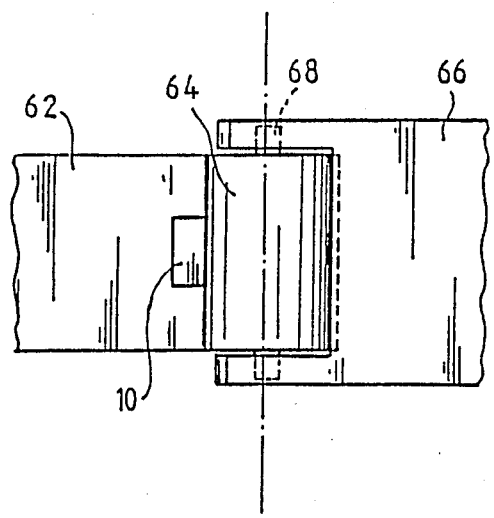
FIGS. 6 and 7 are a plan view and a side view respectively of an application of the invention to robotics.
Figure 7:
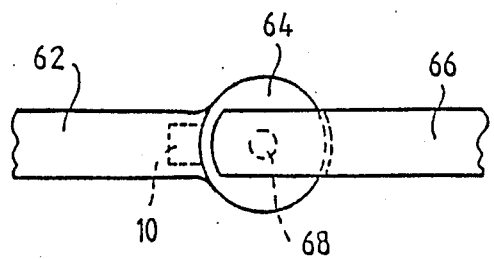

FIGS. 6 and 7 show an application of such a rotary actuator for controlling the displacement of a robot arm, comprising, for example, a first arm 62 fixed to the cylinder 64 of the rotary actuator and a second arm 66 constrained to rotate with the moving shaft 68 of the actuator. As above, the valve 10 is mounted on the cylinder of the rotary actuator, while the position and acceleration sensors may be associated with the shaft 68 or the second arm 66 of the robot. The rotary actuator then constitutes a driving joint interconnecting the arms 62 and 66.

I claim:

1. An apparatus for servo-controlling the position of a pneumatic actuator having a moving member, the apparatus comprising a valve for feeding the actuator with gas under pressure, a position sensor for generating a position signal representative of the position of the moving member, means for determining the speed and the acceleration of the moving member, means for determining the inertia of the moving member from its acceleration at the beginning of its displacement when the actuator is fed at a predetermined constant flow rate of gas under pressure, means for determining speed and acceleration correction factors from said inertia, and a control circuit having an output connected to the valve, an input connected to the position sensor, another input receiving a signal representative of a reference position of the moving member, and means for generating a valve control signal as a function of the difference between the signals at its both inputs and of the speed and acceleration of the moving member as corrected by applying the said correction factors.

2. Apparatus according to claim 1, characterized in that the means for determining the acceleration comprise an accelerometer (30) associated with the moving member (16) and connected to an input of the control circuit (20).

3. Apparatus according to claim 1, characterized in that the means for determining the speed comprise means for differentiating the position signal.

4. Apparatus according to claim 1, characterized in that tables of values of correction factors varying as a function of the inertia or of the initial acceleration of the moving member are recorded in a memory of the control circuit (20).

5. Apparatus according to claim 1, characterized in that the acceleration sensor (34) is of the type comprising a mass mounted on a flexible blade (40) with strain gauges (42) being fixed to the base of the blade.

6. Apparatus according to claim 1, characterized in that the control circuit (20) is of the analog type.

7. Apparatus according to claim 1, characterized in that the control circuit is of the digital type, and in that the acceleration sensor (34) is connected thereto via an analog digital converter.

8. Apparatus according to claim 1, characterized in that the actuator is of the rotary type and constitutes a driving joint of limited angular displacement, comprising a cylinder (64) fixed to a first arm (62) and a rotary moving member (68) fixed to a second arm (66) connected to the first arm via said joint.

9. Apparatus according to claim 1, characterized in that the valve (10), the position sensor (30), and the acceleration sensor (34) are mounted on the actuator (14, 52, 64) and together therewith constitute a compact assembly.

10. A method of servo-controlling the position of a pneumatic actuator having a moving member which is displaced from a stopped position to a reference position, and a valve for feeding the actuator with gas under pressure, said method comprising an initial stage during which the actuator is fed at a predetermined constant flow rate, the inertia of the moving member is determined and corresponding speed and acceleration correction factors are determined from said inertia; an intermediate stage during which the moving member continues its stroke towards the reference position and the actuator is fed at said flow rate, with the servo-control having no effect on the valve; and a final stage during which a control signal applied to the valve is generated from the difference between the reference position and the position of the moving member, and from the speed and the acceleration of the moving member as corrected by applying the said correction factors in order to cause the moving member to stop in the reference position while avoiding oscillation.

11. A method according to claim 10, characterized in that it consists in measuring the acceleration of the moving member (16) by means of an accelerometer, and in determining its inertia by measuring its initial acceleration at the beginning of its stroke while the actuator is being fed with a predetermined flow rate of air or gas under pressure.

12. A method according to claim 10, characterized in that it consists in comparing the inertia of the moving member with predetermined values and in selecting predetermined speed and acceleration control factors as a function of the result of said comparison.

13. A method according to claim 10, wherein the said constant flow rate is a maximal flow rate.

* * * * *